(12) United States Patent
Kuhn

(10) Patent No.: US 9,826,015 B2
(45) Date of Patent: Nov. 21, 2017

(54) DYNAMIC AND AUTOMATIC CONTROL OF LATENCY BUFFERING FOR AUDIO/VIDEO STREAMING

(71) Applicant: QUALCOMM Incorporated, San Diego, CA (US)

(72) Inventor: Steven Kuhn, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 964 days.

(21) Appl. No.: 14/018,019

(22) Filed: Sep. 4, 2013

(65) Prior Publication Data

US 2015/0067186 A1 Mar. 5, 2015

(51) Int. Cl.
| | |
|---|---|
| *H04L 29/06* | (2006.01) |
| *H04N 21/234* | (2011.01) |
| *H04N 21/24* | (2011.01) |
| *H04N 21/242* | (2011.01) |

(Continued)

(52) U.S. Cl.
CPC ..... *H04L 65/607* (2013.01); *H04N 21/23406* (2013.01); *H04N 21/2401* (2013.01); *H04N 21/2402* (2013.01); *H04N 21/242* (2013.01); *H04N 21/44004* (2013.01); *H04N 21/2389* (2013.01)

(58) Field of Classification Search
CPC ...... H04L 65/607; H04L 47/30; H04W 40/00; H04W 36/02; H04W 28/14; H04W 36/023; H04W 72/1221; H04W 72/1284; H04W 36/00; G11B 20/12; G11B 20/18; G11B 20/10527; G11B 19/044; G11B 20/00; G11B 27/00; G11B 20/10; G06F 3/0656; G06F 3/06; H04N 21/44004; H04N 21/242; H04N 21/2402; H04N 21/23406; H04N 21/2401; H04N 21/2389
USPC ......................................................... 709/231
See application file for complete search history.

(56) References Cited

U.S. PATENT DOCUMENTS

| | | | |
|---|---|---|---|
| 5,565,924 A | 10/1996 | Haskell et al. | |
| 5,933,603 A * | 8/1999 | Vahalia | G06F 12/0866 |
| | | | 348/E5.008 |

(Continued)

OTHER PUBLICATIONS

ISA/EPO, International Search Report and Written Opinion of the International Searching Authority, Int'l App. No. PCT/US2014/052476, Nov. 25, 2014, European Patent Office, Rijswijk, NL, 12 pgs.

*Primary Examiner* — Le H Luu
(74) *Attorney, Agent, or Firm* — Holland & Hart LLP

(57) ABSTRACT

Dynamic control by a source device of sink buffer size for audio and/or video streaming over an error-prone channel. The sink buffer size may be determined based on a type of application for a media stream being transmitted from the source device to the sink device for presentation. The techniques may select a buffer size that is smaller for gaming applications, larger for interactive media applications, and even larger for non-interactive media types. The techniques adjust the time delta between a shared clock reference and time reference values of a transport stream that are used by the sink device to determine decoding or presenting of media frames of the transport stream relative to a shared clock reference. In addition, the techniques may account for transceiver latency at the source device due to scanning or multiple concurrent connections.

48 Claims, 11 Drawing Sheets

(51) Int. Cl.
*H04N 21/44* (2011.01)
*H04N 21/2389* (2011.01)

(56) References Cited

U.S. PATENT DOCUMENTS

| | | | | |
|---|---|---|---|---|
| 6,021,440 | A * | 2/2000 | Post | H04N 21/4341 370/473 |
| 6,263,395 | B1 * | 7/2001 | Ferguson | G06F 13/24 710/262 |
| 6,279,041 | B1 * | 8/2001 | Baber | H04L 47/10 370/235 |
| 6,327,275 | B1 | 12/2001 | Gardner et al. | |
| 6,360,271 | B1 * | 3/2002 | Schuster | H04J 3/0632 370/516 |
| 6,378,035 | B1 * | 4/2002 | Parry | G11B 20/10 375/E7.025 |
| 6,611,624 | B1 * | 8/2003 | Zhang | H04N 21/23406 370/498 |
| 6,704,813 | B2 * | 3/2004 | Smirnov | G11B 20/10 348/E5.002 |
| 6,748,481 | B1 * | 6/2004 | Parry | G11B 20/10 375/E7.025 |
| 7,349,675 | B2 * | 3/2008 | Karr | G04G 21/04 370/204 |
| 7,668,243 | B2 | 2/2010 | Ho et al. | |
| 8,069,260 | B2 | 11/2011 | Speicher et al. | |
| 8,341,282 | B2 | 12/2012 | Bassali et al. | |
| 2001/0051972 | A1 * | 12/2001 | Eydelman | G06F 9/54 709/200 |
| 2002/0059276 | A1 * | 5/2002 | Wei Loon | G06F 3/0613 |
| 2004/0066742 | A1 * | 4/2004 | Varsa | H04L 47/10 370/229 |
| 2004/0158732 | A1 * | 8/2004 | Kissel | G06F 21/562 726/13 |
| 2004/0170162 | A1 * | 9/2004 | Hung | H04N 21/2365 370/389 |
| 2004/0218093 | A1 * | 11/2004 | Radha | H04N 21/233 348/384.1 |
| 2004/0267915 | A1 * | 12/2004 | Henry | H04L 12/2805 709/223 |
| 2005/0036521 | A1 | 2/2005 | Kim et al. | |
| 2005/0259754 | A1 * | 11/2005 | Ho | H04N 21/4305 375/240.28 |
| 2006/0104356 | A1 * | 5/2006 | Crinon | H04N 21/23406 375/240.12 |
| 2006/0143420 | A1 * | 6/2006 | Van Gassel | G06F 1/3221 711/170 |
| 2006/0165029 | A1 * | 7/2006 | Melpignano | H04L 1/1854 370/328 |
| 2007/0204124 | A1 * | 8/2007 | Van Gassel | G06F 1/3221 711/170 |
| 2007/0256109 | A1 * | 11/2007 | Kwak | H04N 5/4401 725/95 |
| 2008/0043587 | A1 * | 2/2008 | Gandolph | G11B 20/10527 369/47.15 |
| 2008/0069126 | A1 * | 3/2008 | Howcroft | H04N 5/76 370/412 |
| 2008/0091851 | A1 * | 4/2008 | Sierra | G06F 3/16 710/22 |
| 2008/0133766 | A1 * | 6/2008 | Luo | H04L 47/10 709/231 |
| 2008/0172441 | A1 * | 7/2008 | Speicher | H04L 12/2838 709/201 |
| 2010/0054329 | A1 * | 3/2010 | Bronstein | H04N 19/147 375/240.03 |
| 2012/0069894 | A1 | 3/2012 | Sakimura et al. | |
| 2012/0158988 | A1 * | 6/2012 | Fatehpuria | H04L 65/4084 709/234 |
| 2012/0178368 | A1 | 7/2012 | Fleck et al. | |
| 2012/0311043 | A1 * | 12/2012 | Chen | H04N 21/23406 709/204 |
| 2013/0222210 | A1 * | 8/2013 | Wang | H04N 21/4307 345/2.3 |
| 2013/0223538 | A1 * | 8/2013 | Wang | H04N 21/4307 375/240.25 |
| 2013/0223539 | A1 * | 8/2013 | Lee | H04L 65/607 375/240.25 |

* cited by examiner

DYNAMIC AND AUTOMATIC CONTROL OF LATENCY BUFFERING FOR AUDIO/VIDEO STREAMING

BACKGROUND

The following relates generally to communications, and more specifically to transmission of media content for display on a sink display device. Wired and wireless communications systems are widely deployed to communicate various types of content such as voice, video, packet data, messaging, broadcast, and so on. Wired communication systems include packet-based communication systems (e.g., Ethernet, and the like) and non-packet based communication systems. Wireless communication systems include wireless local area network (WLAN), and cellular multiple-access systems. Generally, these wireless communication systems are capable of supporting communication with multiple users by sharing the available system resources (e.g., time, frequency, and power). Wireless communication systems may use radio technologies for multiple-access including code-division multiple access (CDMA), time-division multiple access (TDMA), frequency-division multiple access (FDMA), and orthogonal frequency-division multiple access (OFDMA). Some communication systems experience variability in latency between packets of information in a communication flow. Variation in latency may be caused by a variety of factors including traffic congestion, packet loss and retry, and the like.

As mobile devices become used more and more for capturing or generating content such as audio, video, or multimedia, users want to be able to share content between mobile devices and other devices such as TVs, computers, audio systems, and the like. One approach mirrors what is displayed on a source device (e.g., smartphone, tablet, and the like) with a sink device (e.g., TV, etc.). In some applications, the source device may transmit the media stream over a wireless link operating according to one of the 802.11 family of standards ("Wi-Fi"). Because Wi-Fi is often jittery and error-prone, some amount of buffering is provided at the sink device to smooth the jitter and packet latency caused by errors in the channel (e.g., retransmissions of data, etc.) to maintain good quality of video rendered at the sink device. It may also be desirable to reduce latency between capture or display of the video at the source device and display of the video at the sink device. However, reducing latency may conflict with maintaining good quality of video at the sink device.

SUMMARY

The described features generally relate to one or more improved systems, methods, and/or apparatuses for dynamic control of latency or jitter buffer size at the sink device for audio and/or video streaming over an error-prone channel. The sink buffer size may be dynamically controlled by the source device based on a type of application for a media stream being transmitted from the source device to the sink device for presentation. For example, the techniques may select a buffer size that is smaller for gaming applications, larger for interactive media applications (e.g., interactive computing, presentations, bi-directional communication, etc.), and even larger for non-interactive media types (e.g., streaming video, static images, etc.). The techniques adjust the time delta between a shared clock reference and time reference values of a transport stream that are used by the sink device to determine decoding or presenting of media frames of the transport stream relative to a shared clock reference.

In embodiments, the source device encapsulates content using an MPEG2 Transport Stream (MPEG-TS) for transmission over a medium. The source device may adjust the time delta between the program clock reference (PCR) and presentation time stamp (PTS) and/or decode time stamp (DTS) values in the MPEG-TS to control the amount of latency or jitter buffering at the sink device before decoding and rendering of the content stream. In addition, the techniques may account for transceiver latency at the source device due to scanning or multiple concurrent connections. While application-based sink buffer size control is described with reference to use of a transport stream over Wi-Fi, these techniques may be applied to encoded content transmitted in a transport stream over any wired or wireless transmission medium for which latency buffering may be applied.

In some embodiments, application-based sink buffer size control is implemented via an internal application programming interface (API) of the source device. The API may determine a use case or application type by program calls of the application or by monitoring a task manager and may determine an amount of buffering based on the application type. The API may determine concurrency and/or scanning operation of the source device based on parameters associated with communication drivers and may increase the amount of buffering based on the scanning or concurrency operation. The API may notify the encoder and transport stream multiplexor of the buffer time delta and the encoder and multiplexor may associate DTS and/or PTS values with audio and/or video frames of the encoded content in the transport stream according to the buffer time delta and PCR. In embodiments, a user override may be provided to allow explicit configuration of the buffer time delta.

Some embodiments are directed to a method performed by a source device, including determining an application type of a media stream for transmission to a sink device, determining, based at least in part on the application type, a buffer size used by the sink device for buffering of a transport stream used for encapsulation of the media stream, encoding frames of the media stream with time reference values relative to a shared clock reference based on the determined buffer size, and encapsulating the encoded frames in the transport stream.

Determining the application type may be based on an application associated with the media stream. For example, the application type of the media stream may be a gaming application type, an interactive computing application type, or a media viewing application type. The method may include receiving, by an application programming interface of the source device, a call from an application running on the source device for establishing a streaming display connection with the sink device. The application type of the media stream may be determined based on the received call.

In some embodiments the method includes determining an off-channel concurrency latency based on a concurrent connection configuration of the source device. Determining the buffer size may be further based on the off-channel concurrency latency. In some embodiments, the method includes determining a scanning latency is based on a channel scanning configuration of the source device. Determining the buffer size may be further based on the scanning latency.

In some embodiments, the method includes transmitting the transport stream to the sink device over a wireless local area network connection. The method may include displaying the media stream at the source device concurrently with encoding of the media stream for transmission to the sink device. The method may include transmitting time values of the shared clock reference at periodic intervals in the transport stream.

In some embodiments, the transport stream is a Moving Picture Experts Group (MPEG) transport stream (MPEG-TS). The time reference values may include a presentation time stamp (PTS) or a decode time stamp (DTS), or both PTS and DTS values. The shared clock reference may be a program clock reference (PCR) synchronized at the sink device.

Some embodiments are directed to an apparatus for dynamic control of sink device buffering by a source device, including means for determining an application type of a media stream for transmission to a sink device, means for determining, based at least in part on the application type, a buffer size used by the sink device for buffering of a transport stream used for encapsulation of the media stream, means for encoding frames of the media stream with time reference values relative to a shared clock reference based on the determined buffer size, and means for encapsulating the encoded frames in the transport stream.

The means for determining the application type may determine the application type based on an application associated with the media stream. The application type of the media stream may be, for example, a gaming application type, an interactive computing application type, or a media viewing application type. The apparatus may include means for receiving, by an application programming interface of the source device, a call from an application running on the source device for establishing a streaming display connection with the sink device. The means for determining the application type of the media stream may determine the application type based on the received call.

In some embodiments, the apparatus for dynamic control of sink device buffering includes means for determining an off-channel concurrency latency based on a concurrent connection configuration of the source device. The means for determining the buffer size may further determine the buffer size based on the off-channel concurrency latency. In some embodiments, the apparatus includes means for determining a scanning latency based on a channel scanning configuration of the source device. The means for determining the buffer size may further determine the buffer size based on the determined scanning latency.

In some embodiments, the apparatus for dynamic control of sink device buffering includes means for transmitting the transport stream to the sink device over a wireless local area network connection. The apparatus may include means for displaying the media stream at the source device concurrently with encoding of the media stream for transmission to the sink device. The apparatus may include means for transmitting time values of the shared clock reference at periodic intervals in the transport stream.

In some embodiments, the transport stream is a Moving Picture Experts Group (MPEG) transport stream (MPEG-TS). The time reference values may be a presentation time stamp (PTS) or a decode time stamp (DTS), or both PTS and DTS values. The shared clock reference may be a program clock reference (PCR) synchronized at the sink device.

Some embodiments are directed to a device for dynamic control of sink device buffering by a source device, including a processor, and a memory in electronic communication with the processor. The memory may include instructions being executable by the processor to determine an application type of a media stream for transmission to a sink device, determine, based at least in part on the application type, a buffer size used by the sink device for buffering of a transport stream used for encapsulation of the media stream, encode frames of the media stream with time reference values relative to a shared clock reference based on the determined buffer size, and encapsulate the encoded frames in the transport stream.

The memory may include instructions being executable by the processor to determine the application type based on an application associated with the media stream. The application type of the media stream may be, for example, a gaming application type, an interactive computing application type, or a media viewing application type. The memory may include instructions being executable by the processor to receive, by an application programming interface of the source device, a call from an application running on the source device for establishing a streaming display connection with the sink device and determine the application type of the media stream based on the received call.

In some embodiments, the memory includes instructions being executable by the processor to determine an off-channel concurrency latency based on a concurrent connection configuration of the source device, and determine the buffer size further based on the determined off-channel concurrency latency. In some embodiments, the memory includes instructions being executable by the processor to determine a scanning latency based on a channel scanning configuration of the source device, and determine the buffer size further based on the determined scanning latency.

In some embodiments, the memory includes instructions being executable by the processor to transmit the transport stream to the sink device over a wireless local area network connection. The memory may include instructions being executable by the processor to display the media stream at the source device concurrently with encoding of the media stream for transmission to the sink device. The memory may include instructions being executable by the processor to transmit time values of the shared clock reference at periodic intervals in the transport stream.

In some embodiments, the transport stream is a Moving Picture Experts Group (MPEG) transport stream (MPEG-TS). The time reference values may include a presentation time stamp (PTS) or a decode time stamp (DTS), or both PTS and DTS values. The shared clock reference may be a program clock reference (PCR) synchronized at the sink device.

Some embodiments are directed to a computer program product for dynamic control of sink device buffering by a source device. The computer program product includes a computer-readable medium, including code for determining an application type of a media stream for transmission to a sink device, determining, based at least in part on the application type, a buffer size used by the sink device for buffering of a transport stream used for encapsulation of the media stream, encoding frames of the media stream with time reference values relative to a shared clock reference based on the determined buffer size, and encapsulating the encoded frames in the transport stream.

The computer-readable medium may include code for determining the application type based on an application associated with the media stream. The application type of the media stream may be, for example, a gaming application type, an interactive computing application type, or a media viewing application type. The computer-readable medium may include code for receiving, by an application programming interface of the source device, a call from an application running on the source device for establishing a streaming display connection with the sink device and determining the application type of the media stream based on the received call.

In some embodiments, the computer-readable medium includes code for determining an off-channel concurrency latency based on a concurrent connection configuration of the source device, and determining the buffer size further based on the off-channel concurrency latency. In some embodiments, the computer-readable medium includes code for determining a scanning latency based on a channel scanning configuration of the source device, and determining the buffer size further based on the scanning latency.

In some embodiments, the computer-readable medium includes code for transmitting the transport stream to the sink device over a wireless local area network connection. The computer-readable medium may include code for displaying the media stream at the source device concurrently with encoding of the media stream for transmission to the sink device. The computer-readable medium may include code for transmitting time values of the shared clock reference at periodic intervals in the transport stream.

In some embodiments, the transport stream is a Moving Picture Experts Group (MPEG) transport stream (MPEG-TS). The time reference values may include a presentation time stamp (PTS) or a decode time stamp (DTS), or both PTS and DTS values. The shared clock reference may be a program clock reference (PCR) synchronized at the sink device.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
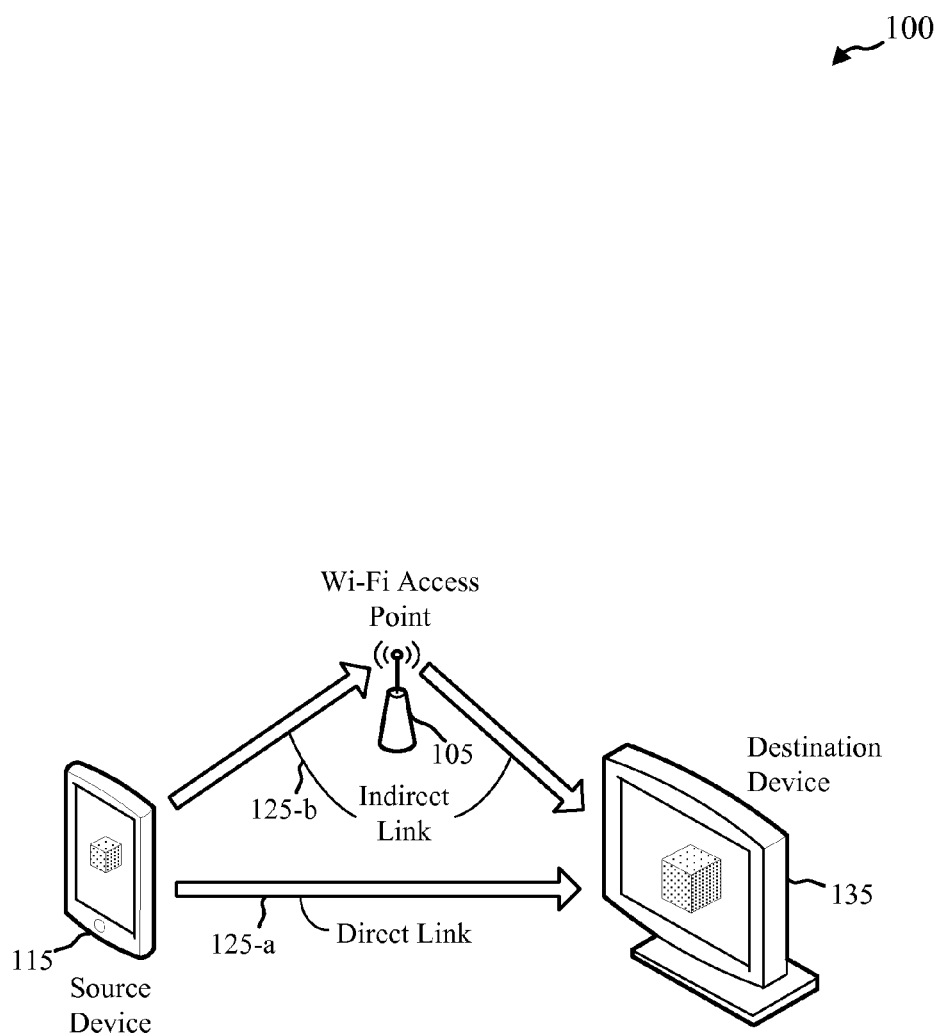
FIG. 1 shows a diagram of a system for display of content from one device onto the display of another device by video and/or audio content streaming.

Described embodiments are directed to systems and methods for dynamic control of latency or jitter buffer size at the sink device for audio and/or video streaming over an error-prone channel. The sink buffer size may be dynamically controlled by the source device based on a type of application for a media stream being transmitted from the source device to the sink device for presentation. For example, the techniques may select a buffer size that is smaller for gaming applications, larger for interactive media applications (e.g., interactive computing, presentations, bi-directional communication, etc.), and even larger for non-interactive media types (e.g., streaming video, static images, etc.). The techniques adjust the time delta between a shared clock reference and time reference values of a transport stream that are used by the sink device to determine decoding or presenting of media frames of the transport stream relative to a shared clock reference.

In some embodiments, the source device encapsulates content using an MPEG-TS for transmission over a medium. The source device may adjust the time delta between the PCR and PTS/DTS values in the MPEG-TS to control the amount of latency or jitter buffering at the sink device before decoding and rendering of the content stream. In addition, the techniques may account for transceiver latency at the source device due to scanning or multiple concurrent connections. While application-based sink buffer size control is described with reference to use of a transport stream over Wi-Fi, these techniques may be applied to encoded content transmitted in a transport stream over any wired or wireless transmission medium for which latency buffering may be applied.

In some embodiments, application-based sink buffer size control is implemented via an internal API of the source device. The API may determine a use case or application type by program calls of the application or by monitoring a task manager and may determine an amount of buffering based on the application type. The API may determine concurrency and/or scanning operation of the source device based on parameters associated with communication drivers and may increase the amount of buffering based on the scanning or concurrency operation. The API may notify the encoder and transport stream multiplexor of the buffer time delta and the encoder and multiplexor may associate DTS and/or PTS values with audio and/or video frames of the encoded content in the transport stream according to the buffer time delta and PCR. In embodiments, a user override may be provided to allow explicit configuration of the buffer time delta.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring now to FIG. 1, a system 100 includes a source device 115 and a sink device 135 and may include one or more access points 105. Examples of the source device 115 may include, but are not limited to, smartphones, cell phones, wireless headphones, wearable computing devices, tablets, personal digital assistants (PDAs), laptops, or any other device capable of communicating with a sink device via a connection (e.g., wired, cellular wireless, Wi-Fi, etc). Examples of the sink devices 135 may include, but are not limited to, in-vehicle infotainment devices, TVs, computers, laptops, projectors, cameras, smartphones, wearable computing devices, or any other device capable of communicating with a source device 115 and displaying content received from the source device 115. The sink device 135 may be a combination of devices. For example, the sink device 135 may include a display device and a separate device for receiving, buffering, and decoding content for display on the display device.

Source device 115 may be connected to sink device 135 via link 125. Link 125 is illustrated in FIG. 1 as a wireless link but may be a wired or wireless link, in embodiments. Some wired or wireless links use networking protocols that may have non-deterministic packet transfer timing. For example, some communication links utilize protocols in which a device verifies the absence of other traffic before transmitting on a shared transmission medium, such as an electrical bus, or a band of the electromagnetic spectrum. Arbitration for use of the medium by several devices can cause variation in transmission time from packet to packet. In addition, interference may cause packet loss and re-try, which may result in packet latency or packets being received out of order. While the following techniques are described using the wireless networking architecture illustrated in FIG. 1, the described techniques are applicable to any suitable wired or wireless communication technology.

In one embodiment, source device 115 is connected to sink device 135 via a Wi-Fi Display connection. Wi-Fi Display, which may be known as Miracast, allows a portable device or computer to transmit video and audio to a compatible display wirelessly. It enables delivery of compressed standard or high-definition video over a wireless link 125. Wireless link 125 may be a direct wireless link (e.g., peer-to-peer link 125-a), or an indirect wireless link (e.g., indirect link 125-b). Examples of direct wireless links include Wi-Fi Direct connections and connections established by using a Wi-Fi Tunneled Direct Link Setup (TDLS) link. The Wi-Fi devices in these examples may communicate according to the WLAN radio and baseband protocol including physical and MAC layers from IEEE 802.11, and its various versions including, but not limited to, 802-11b, 802.11g, 802.11a, 802.11n, 802.11ac, 802.11ad, 802.11ah, etc.

Miracast allows users to echo the display from one device onto the display of another device by video and/or audio content streaming. The link 125 between the source device 115 and sink device 135 may be bi-directional. In one configuration, the connection between the source device 115 and a sink device 135 may also allow users to launch applications stored on the source device 115 via the sink device 135. For example, the sink device 135 may include various input controls (e.g., mouse, keyboard, knobs, keys, user interface buttons). These controls may be used at the sink device 135 to initialize and interact with applications stored on the source device 115.

Miracast may use a transport stream such as an MPEG2 Transport Stream (MPEG-TS). The content may be encoded according to a media encoding format (e.g., h.264, MPEG-4, etc.) and may be multiplexed into the transport stream with other information (e.g., error correction, stream synchronization, etc.) for transmission to the sink device 135. The source device 115 may maintain a shared clock reference and periodically transmit the reference clock time in the transport stream. The sink device 135 may synchronize a local shared clock reference to the clock reference of the source device 115 using the periodically transmitted reference clock time values. The source device 115 may encode frames of the transport stream with reference values used by the sink device 135 to re-order the frames for decoding and to synchronize output of the media stream relative to the shared reference clock.

As described above, some communication links may have non-deterministic transmission latency or jitter between transmitted packets. For example, latency in shared-medium communication systems may be caused by collisions, retries, packet-loss, and/or arbitration between users for the medium. The transport stream may be buffered at the sink device 135 to reduce rendering issues such as frame skipping or stutter due to packet latency and jitter over the link 125.

For some interfaces such as Wi-Fi, the source device 115 may scan other channels for other connections or support multiple concurrent connections over multiple channels. For example, the source device 115 may have a Wi-Fi Direct connection for transmitting the content stream to the sink device 135 and may support other concurrent connections to other devices, Wi-Fi access points 105, or cellular access points. In these instances, the source device 115 may spend a certain amount of time scanning or operating on channels associated with the other connections. In order for the rendered content at the sink device 135 to not be interrupted, the buffer size at the sink device 135 should be large enough to account for time periods where the source device 115 is operating on other channels.

For MPEG-TS, the transport stream contains a clock reference known as the program clock reference (PCR). The PCR is periodically transmitted (e.g., once per 100 ms, etc.) and the sink device synchronizes a local PCR timing clock to the transmitted PCR values. The encoded video and audio frames in the transport stream are associated with a decode time known as the decode time stamp (DTS) and a presentation time known as the presentation time stamp (PTS). The sink device decodes and presents audio and video elements based on the DTS and PTS associated with the audio and video frames relative to the PCR. For example, the sink device 135 may display decoded audio and/or video frames when PTS values associated with the frames correspond to the PCR. Similarly, DTS values may be used at the sink device 135 to determine when the frames are decoded.

The system 100 including the source device 115 may be configured to dynamically control latency or jitter buffer size at the sink device 135 for audio and/or video streaming over an error-prone channel. The sink buffer size may be dynamically controlled by the source device 115 based on a type of application for a media stream being transmitted from the source device 115 to the sink device 135 for presentation. For example, the techniques may select a buffer size that is smaller for gaming applications, larger for interactive media applications (e.g., interactive computing, presentations, bi-directional communication, etc.), and even larger for non-interactive media types (e.g., streaming video, static images, etc.). The techniques adjust the time delta between a shared clock reference and time reference values of a transport stream that are used by the sink device to determine decoding or presenting of media frames of the transport stream relative to a shared clock reference.

In embodiments, the source device encapsulates content using an MPEG-TS for transmission over a medium. The source device may adjust the time delta between the PCR and PTS/DTS values in the MPEG-TS to control the amount of latency or jitter buffering at the sink device before decoding and rendering of the content stream. In addition, the techniques may account for transceiver latency at the source device due to scanning or multiple concurrent connections. While application-based sink buffer size control is described with reference to use of a transport stream over Wi-Fi, these techniques may be applied to encoded content transmitted in a transport stream over any wired or wireless transmission medium for which latency buffering may be applied.

In some embodiments, application-based sink buffer size control is implemented via an internal API of the source device. The API may determine a use case or application type by program calls of the application or by monitoring a task manager and may determine an amount of buffering based on the application type. The API may determine concurrency and/or scanning operation of the source device based on parameters associated with communication drivers and may increase the amount of buffering based on the scanning or concurrency operation. The API may notify the encoder and transport stream multiplexor of the buffer time delta and the encoder and multiplexor may associate DTS and/or PTS values with audio and/or video frames of the encoded content in the transport stream according to the buffer time delta and PCR. In embodiments, a user override may be provided to allow explicit configuration of the buffer time delta.

Figure 2:
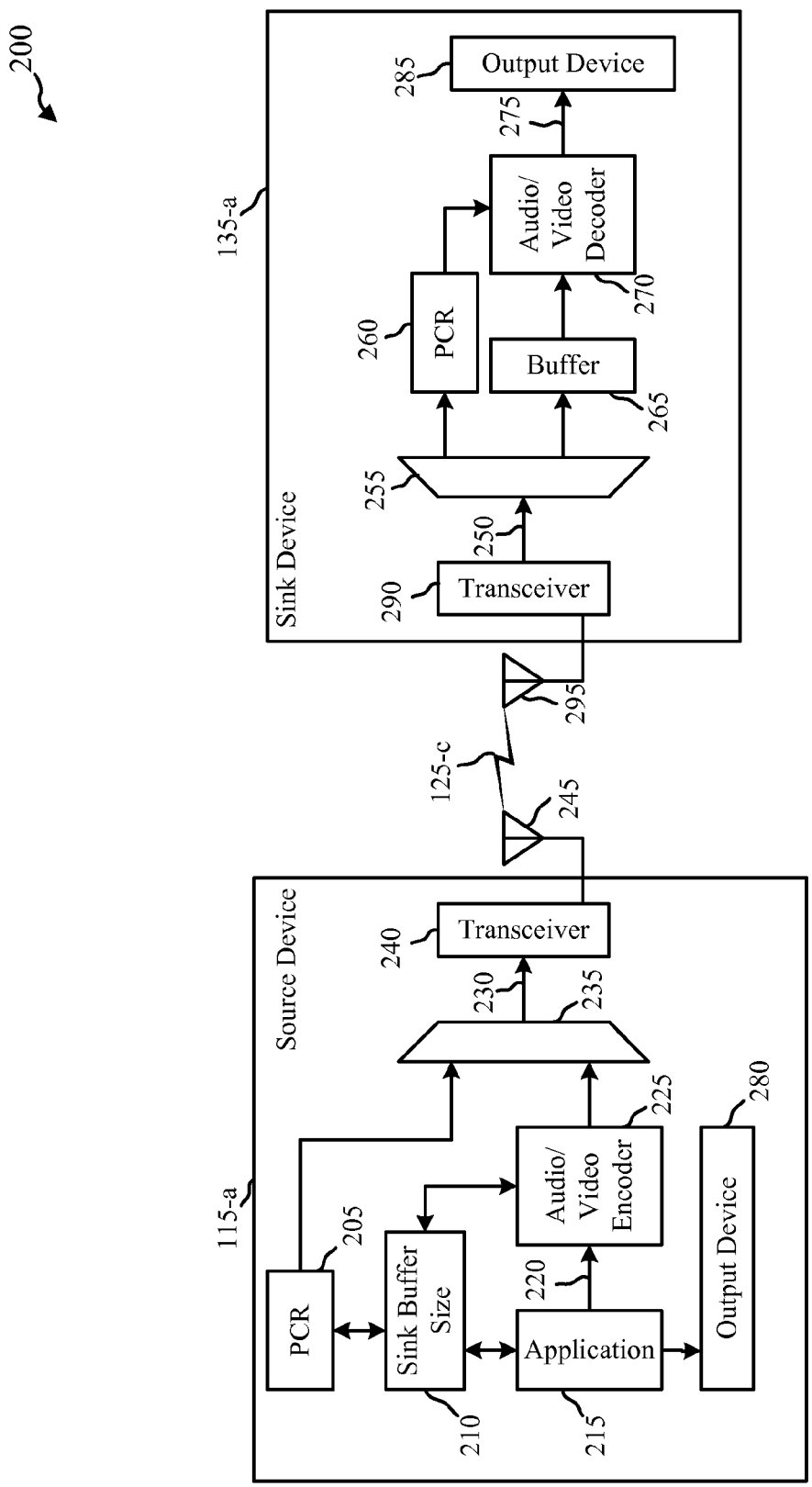
FIG. 2 shows an example system for display of content from a source device to a sink device using application-based control of sink buffering using frame reference timing in accordance with various embodiments.

FIG. 2 illustrates an example system 200 for display of content from a source device 115-a to a sink device 135-a using application-based control of sink buffer size using encapsulated frame reference timing in accordance with various embodiments. FIG. 2 may illustrate streaming of content from a source device 115-a to a sink device 135-a over a Wi-Fi connection 125-c using a transport stream such as an MPEG2 Transport Stream (MPEG-TS). The Wi-Fi connection 125-c may be direct (e.g., Wi-Fi Direct, etc.) or indirect (e.g., via a Wi-Fi access point 105 or other device, etc.). The content may be encoded according to a media encoding format (e.g., h.264, MPEG-4, etc.) and may be multiplexed into a transport stream (e.g., MPEG-TS, etc.) for transmission.

The source device 115-a may include a system clock reference 205 (e.g., PCR), one or more applications 215, sink buffer size module 210, audio/video encoder 225, transport stream multiplexor 235, transceiver 240, output device 280 (e.g., display device, speaker, etc.), and antenna(s) 245. The sink device 135-a may include antenna(s) 295, transceiver 290, transport stream de-multiplexor 255, clock reference 260, buffer 265, audio/video decoder 270, and output device 285 (e.g., display device, speaker, etc.). As described above, source device 115-a may encode a content stream 220 from an application 215 according to an encoding format and may encapsulate the encoded video into transport stream 230. Clock reference values from the clock reference 205 may be transmitted periodically in transport stream 230. The sink device 135-a may synchronize the local clock reference 260 to the clock reference 205 of the source device 115-a. The source device 115-a may also present the content from application 215 on output device 280 (e.g., display device, speaker, etc.).

Figure 3:
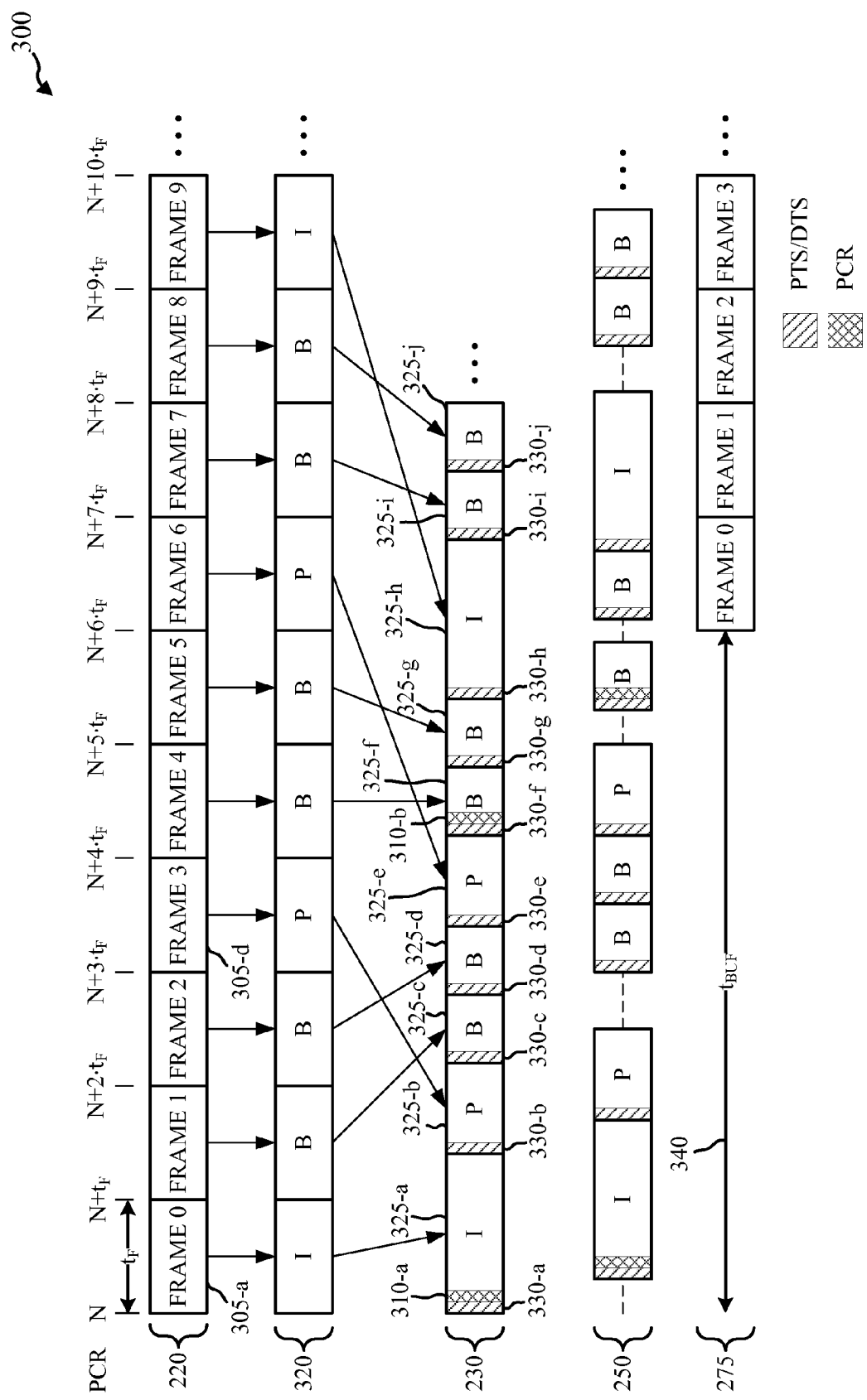
FIG. 3 shows a diagram illustrating an example transmission of a media stream in the architecture of FIG. 2 in accordance with various embodiments.

FIG. 3 is a diagram 300 illustrating an example transmission of a media stream in the architecture of system 200 in accordance with various embodiments. As illustrated in FIG. 3, application 215 may generate media stream 220 which may be, for example, a stream of video frames 305. The media stream may have a frame rate of $1/t_F$ (e.g., 30 Hz, 60 Hz, etc.).

Media stream 220 may be input into encoder 225, which may generate an encoded media stream 320. Encoder 225 may use an encoding format that may compress media stream 220 and may use different types of encoded frames which may have different levels of compression. For example, diagram 300 illustrates encoded media stream 320 having Intra (I) frames which contain information for a full image of a video stream, Predicted (P) frames which are predicted from past I or P frames, and Bi-directional Predicted (B) frames which use past and future I and P frames for motion compensation and offer the greatest compression. The encoder 225 may re-order the encoded frames for transmission based on the order in which the frames are used for decoding. For example, timing diagram 300 illustrates that I and/or P frames may be re-ordered before B frames in the encoded media stream 320.

The encoded media stream 320 may be encapsulated into a transport stream format (e.g., MPEG-TS, etc.) by transport stream multiplexor 235. The transport stream 230 is then sent to transceiver 240 for transmission to the sink device 135-a via transmission link 125-c. The transport stream 230 may include time reference values associated with the encapsulated frames for decoding and display of the frames based on a shared clock reference (e.g., PCR 205, etc.). The transport stream 230 may also include periodic transmission of reference clock values for synchronization of the local shared clock reference at the sink device 135-a. As illustrated in diagram 300, the MPEG-TS transport stream 230 may include PTS and/or DTS values 330 associated with each of the frames in the transport stream. The PTS and/or DTS values 330 may be encoded in packets of the transport stream 230. The transport stream 230 may include PCR values 310-a and 310-b, which may be used by the sink device 135-a to synchronize a local PCR 260 to the PCR 205 at the source device 115-a.

As described above, the received transport stream 250 at the sink device 135-a may have variable latency and jitter in packet transmission over the transmission link 125-c. For example, diagram 300 shows variable latency in receipt of packets in the received transport stream 250. At the sink device 135-a, the received transport stream 250 may be buffered and decoded. The sink device 135-a may buffer packets of the received transport stream 250 prior to decoding. Additionally or alternatively, it may decode the received packets and buffer the decoded media stream 275 prior to output of the decoded media stream 275 on the output device 285. Frames of the decoded media stream 275 in the sink device 135-*a* may be displayed on the display 285 according to their associated PTS values.

Source device 115-*a* may determine a sink buffer size $t_{BUF}$ 340 based on the use case of the media stream 220 (e.g., via sink buffer size module 210). The use case of the media stream may be determined based on the type of application 215. For example, source device 115-*a* may select a higher sink buffer size $t_{BUF}$ 340 for more buffering at the sink device 135-*a* for non-interactive multimedia display and other latency tolerant applications and media streams. Source device 115-*a* may select a lower sink buffer size $t_{BUF}$ 340 for less buffering at the sink device 135-*a* for applications and media streams such as interactive computer or gaming that are less latency tolerant. For example, source device 115-*a* may select a sink buffer size $t_{BUF}$ 340 of 200-500 milliseconds (ms) for multimedia viewing (e.g., video and/or audio playback or streaming, etc.), 80-200 ms for interactive computing (e.g., power-point, etc.), and 40-80 ms for gaming. These are merely illustrative examples and source device 115-*a* may have more or fewer categories for selecting sink buffer size $t_{BUF}$ 340 and may select other values for various categories.

Source device 115-*a* may also select sink buffer size $t_{BUF}$ 340 using other factors including the selected transmission medium (e.g., Wi-Fi vs. power line, etc.), the capacity of the communication link (e.g., in bps, etc.), the data rate of the media stream (e.g., in bps, etc.), the encoding format, or channel conditions (e.g., measured, etc.) that may affect jitter of communications using the transmission medium.

Source device 115-*a* may determine decode time reference values (e.g., DTS, etc.) and presentation time reference values (e.g., PTS, etc.) for frames of the transport stream 230 based on the determined sink buffer size $t_{BUF}$ 340 and a decode order of the frames. The decode time reference values and presentation time reference values may be multiplexed with the frames of the transport stream as illustrated by time reference values 330 for each transport stream frame 325. Notably, by using the presentation time reference values and/or decode time reference values of the transport stream, the source device 115-*a* does not have to communicate the sink buffer size $t_{BUF}$ 340 to the sink device 135-*a* prior to transmitting the transport stream. In addition, sink devices do not need to support additional features for source device control of sink buffer size. The sink buffer size is controlled through the presentation time reference values and/or decode time reference values already used by the transport stream protocol for synchronization of output of media content.

The presentation time reference values for transmission in the transport stream may be determined by the value of the reference clock (e.g., PCR, etc.) when the frame is transmitted and the sink buffer size $t_{BUF}$ 340. The decode time reference values may be determined by the value of the reference clock (e.g., PCR, etc.), the sink buffer size $t_{BUF}$ 340, and may indicate the order for decoding. The decode time reference values may account for the decode time ($t_{DEC}$), which may vary based on the type of encoding (e.g., number of B frames, etc.). Table 1 shows calculated values for presentation time reference values (e.g., PTS, etc.) and decode time reference values (e.g., DTS, etc.) of transport stream frames 325, according to one example. In the example shown in FIG. 3, the decoded media stream 275 is displayed on sink device 135-*a* with $t_{BUF}=6 \cdot t_F$.

TABLE 1

| Frame | DTS | PTS |
|---|---|---|
| 325-a | $N + t_{BUF} - t_{DEC}$ | $N + t_{BUF}$ |
| 325-b | $N + t_{BUF} + t_F - t_{DEC}$ | $N + t_{BUF} + 3 \cdot t_F$ |
| 325-c | $N + t_{BUF} + 2 \cdot t_F - t_{DEC}$ | $N + t_{BUF} + t_F$ |
| 325-d | $N + t_{BUF} + 3 \cdot t_F - t_{DEC}$ | $N + t_{BUF} + 2 \cdot t_F$ |
| 325-e | $N + t_{BUF} + 4 \cdot t_F - t_{DEC}$ | $N + t_{BUF} + 6 \cdot t_F$ |
| 325-f | $N + t_{BUF} + 5 \cdot t_F - t_{DEC}$ | $N + t_{BUF} + 4 \cdot t_F$ |
| 325-g | $N + t_{BUF} + 6 \cdot t_F - t_{DEC}$ | $N + t_{BUF} + 5 \cdot t_F$ |
| 325-h | $N + t_{BUF} + 7 \cdot t_F - t_{DEC}$ | $N + t_{BUF} + 9 \cdot t_F$ |
| 325-i | $N + t_{BUF} + 8 \cdot t_F - t_{DEC}$ | $N + t_{BUF} + 7 \cdot t_F$ |
| 325-j | $N + t_{BUF} + 9 \cdot t_F - t_{DEC}$ | $N + t_{BUF} + 8 \cdot t_F$ |

Source device 115-*a* may include user settings that allow the user to select preferences related to the amount of buffering at the sink device 135-*a*. For example, the user may be able to choose a preference between lower latency or higher reliability display of the media stream and the source device 115-*a* may adjust the sink buffer size $t_{BUF}$ 340 accordingly. The user may be able to set sink buffer size preferences based on the use categories, for individual applications, or for individual media streams. Additionally or Alternatively, the user may be able to associate particular applications with application types. In some examples, the user may be able to set the sink buffer size $t_{BUF}$ 340 directly (e.g., in ms, etc.).

Figure 4:
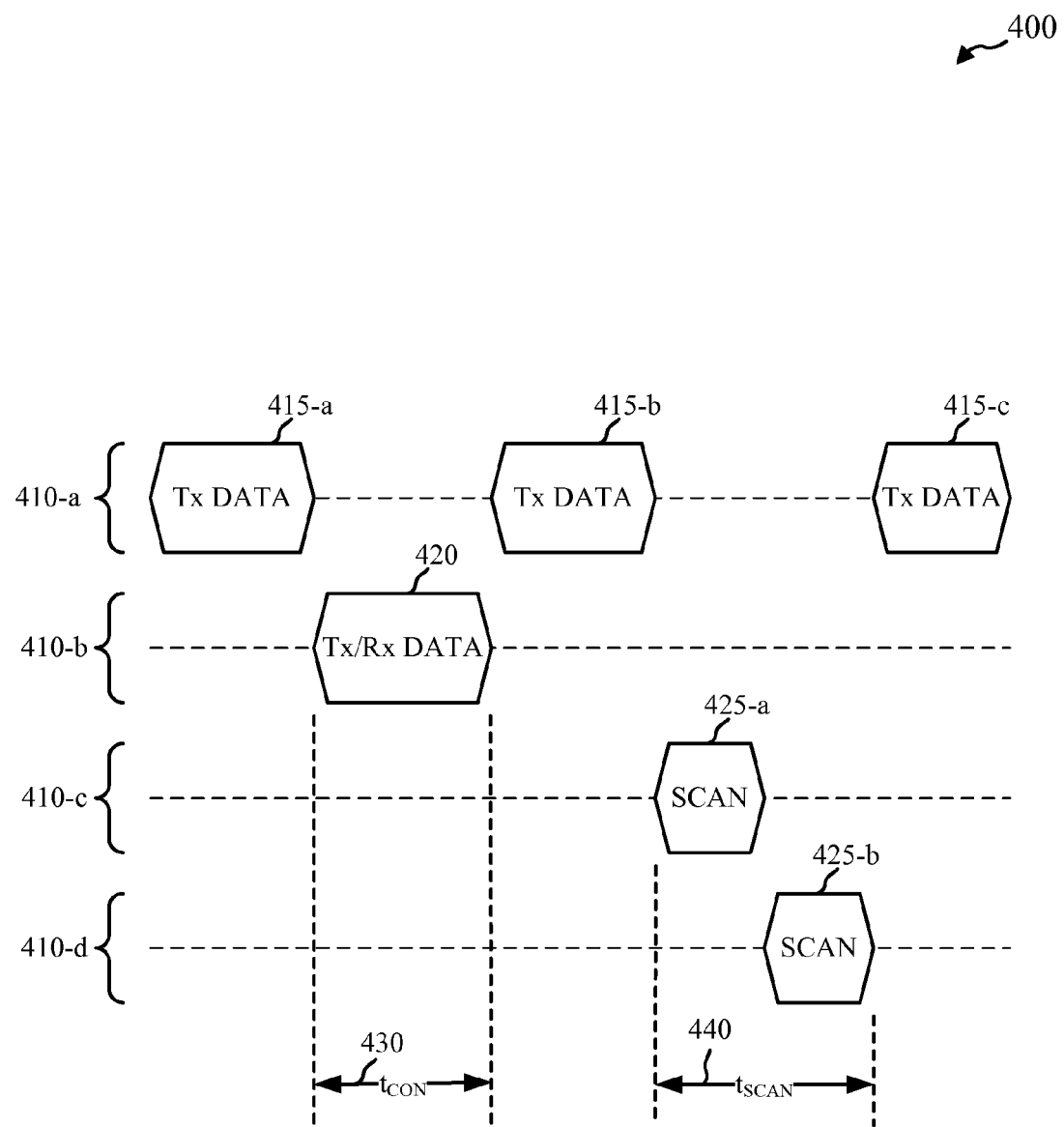
FIG. 4 shows a timing diagram that illustrates latency based on concurrency and scanning performed by source device in accordance with various embodiments.

Source device 115-*a* may also vary sink buffer size $t_{BUF}$ 340 based on concurrency and scanning configuration. FIG. 4 shows a timing diagram 400 that illustrates latency based on concurrency and scanning performed by a source device 115 (e.g., source device 115-*a* illustrated in FIG. 2, etc.). In timing diagram 400, source device 115 may be transmitting a transport stream on channel 410-*a* to a sink device 135 while also maintaining a concurrent connection with another device or access point over channel 410-*b*. After transmission of packets of the transport stream in data transmission 415-*a* over channel 410-*a*, the source device 115 may switch to transmit or receive data 420 on channel 410-*b*.

Source device 115 may determine an off-channel concurrency time $t_{CON}$ 430 for which the source device 115 will switch from the connection link for transmitting the transport stream over channel 410-*a* to transmit or receive data in service of the concurrent connection link. The off-channel concurrency time $t_{CON}$ 430 may represent, for example, a time period for switching channels, handshaking with the other devices or access points, and transfer of one or more data packets. In some examples, source device 115 may increase the offset 340 by approximately 60 ms for supporting off-channel concurrency. Where the source device 115 supports multiple concurrent connections (e.g., K other connections, etc.) in addition to the connection link with the sink device 135, the off-channel concurrency time $t_{CON}$ 430 may be added to the sink buffer size $t_{BUF}$ 340 for each concurrent connection supported. For example, the total off-channel concurrency time may be given by:

$$t_{CON} = \sum_{i=1}^{K} t_{CON}[i]$$

Alternatively, one off-channel concurrency time $t_{CON}$ 430 may be added to the sink buffer size $t_{BUF}$ 340 regardless of the number of connections, or the off-channel concurrency time $t_{CON}$ 430 added for each connection may be reduced by a scaling factor F. For example, the total off-channel concurrency time may be given by:

$$t_{CON} = \sum_{i=1}^{K} F \cdot t_{CON}[i]$$

Source device 115 may also be associated with one or more access points 105 and may perform active or passive scanning 425 of channels of the access points 105. For example, timing diagram 400 shows that, after performing data transfer 415-b, source device 115 performs scanning 425-a and 425-b on channels 410-c and 410-d, respectively. Source device 115 may perform data transfer 415-c over channel 410-a. Source device 115 may determine a scanning time $t_{SCAN}$ 440 for which the source device 115 will switch from the connection link for transmitting the transport stream over channel 410-a to scanning one or more channels associated with the access points 105. The scanning time $t_{SCAN}$ 440 may increase channel latency by, for example, approximately 110 ms for passive scanning and approximately 50 ms for active scanning.

Where source device 115 has concurrent connections with other devices and access points for which scanning is required, the source device 115 may determine the additional latency to be added to sink buffer size $t_{BUF}$ 340 in a variety of ways. In one example, additional latency for sink buffer size $t_{BUF}$ 340 may be determined according to the sum of off-channel concurrency time $t_{CON}$ 430 and scanning time $t_{SCAN}$ 440. Alternatively, the additional latency may be determined according to the higher of the off-channel concurrency time $t_{CON}$ 430 and scanning time $t_{SCAN}$ 440. This technique may be selected, for example where the capacity of the link is high relative to the data rate of the transport stream.

Figure 5:
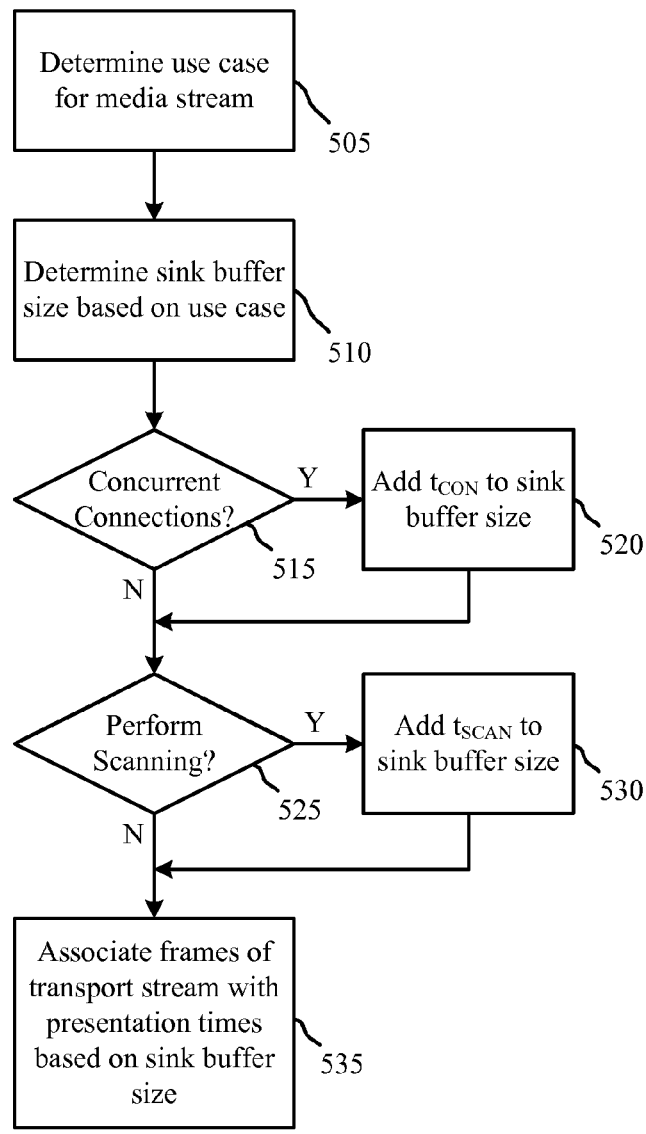
FIG. 5 shows a method for application-based control of sink buffer size using frame reference timing in accordance with various embodiments.

FIG. 5 illustrates a method 500 for application-based control of sink buffer size using frame reference timing in accordance with various embodiments. Method 500 may be employed, for example, by the source devices 115 of FIG. 1 or FIG. 2. In one implementation, the sink buffer size module 210 or the devices 700 or 800 described with reference to FIG. 2, FIG. 7 or FIG. 8 may execute one or more sets of codes to control the functional elements of a source device 115 to perform the functions described below.

At block 505 of method 500, the source device 115 determines a use case for a media stream. The source device 115 may determine the use case based on a type of application associated with the media stream. For example, the source device 115 may determine whether the associated application is used for multimedia playback, interactive computing, gaming, or other use case.

At block 510, the source device 115 determines the sink buffer size based on the use case of the media stream. For example, the source device 115 may select a higher sink buffer size for non-interactive multimedia display and other latency tolerant applications and media streams and lower sink buffer size for applications and media streams such as interactive computer or gaming that are less latency tolerant. The source device may receive user input associated with the user's preferences of lower latency or higher reliability media transfer and may adjust the sink buffer size accordingly.

At block 515, the source device 115 may determine if other connections are concurrently supported that will result in latency to the media stream. For example, where the source device 115 is using a Wi-Fi Display connection to transmit the media stream to the sink device 135, the source device 115 may determine if other Wi-Fi connections are concurrently supported and the effect of the concurrently supported connections on latency of the Wi-Fi Display connection. If other connections are concurrently supported, the source device 115 adds a time period $t_{CON}$ to the sink buffer size at block 520. The time period $t_{CON}$ may be added for each additionally supported connection, or may be scaled for multiple additional concurrent connections.

At block 525, the source device 115 may determine if scanning is to be performed based on associations with wireless access points. For example, the source device 115 may be currently connected to an access point 105 and may determine that active or passive scanning is to be performed for channels associated with the access point 105. If scanning is to be performed, the source device 115 may add the scanning time $t_{SCAN}$ to the sink buffer size at block 530.

At block 530, the source device 115 transmits the media stream in a transport stream format with frames of the transport stream associated with presentation time reference values calculated based on the determined sink buffer size from blocks 510, 515, 520, 525, and/or 530. The source device 115 may associate the frames of the transport stream with decode time reference values calculated based on the determined sink buffer size, frame decode order, and decode time.

Figure 6:
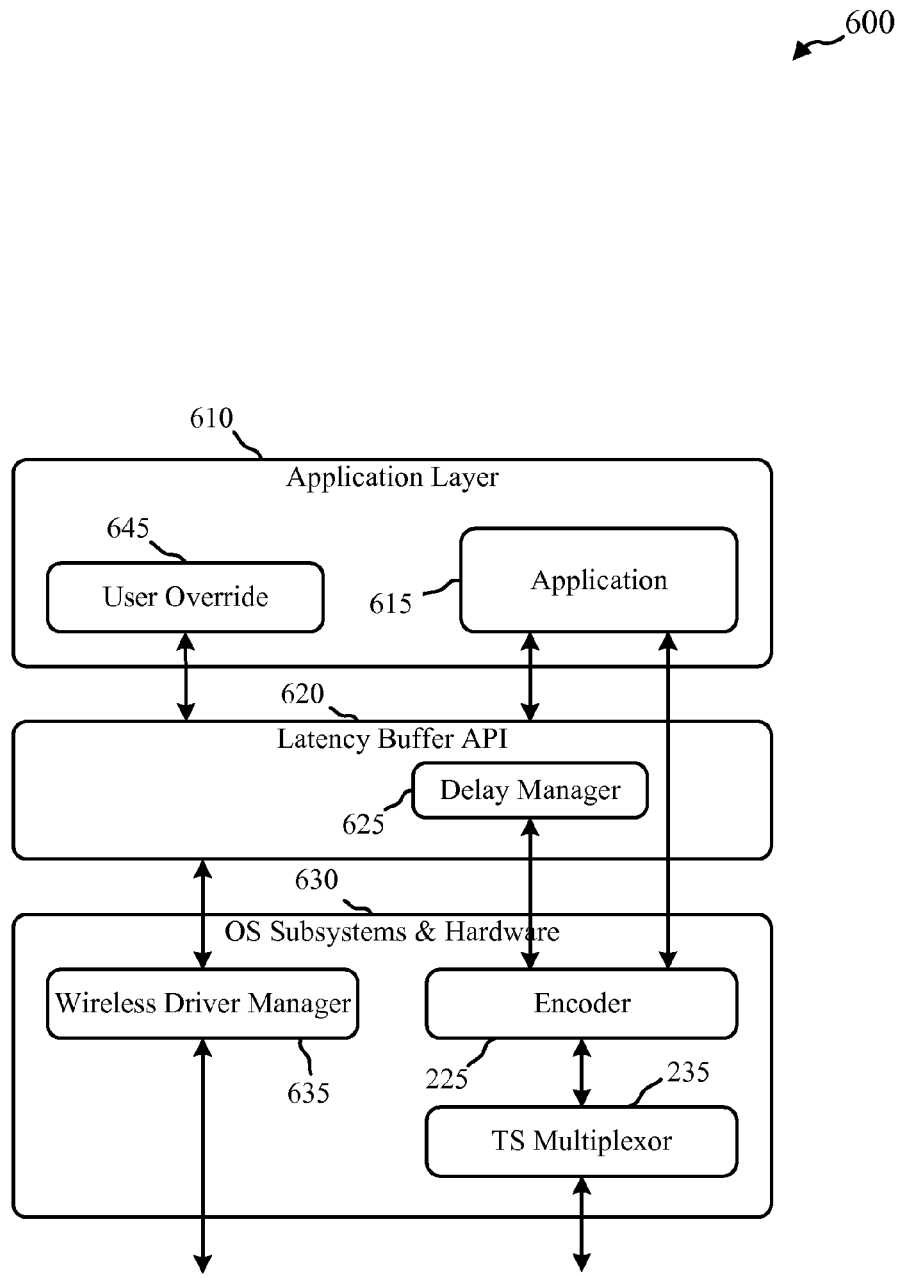
FIG. 6 shows a system architecture for application-based control of sink buffer size using frame reference timing in accordance with various embodiments.

FIG. 6 illustrates a system architecture 600 for application-based control of sink buffer size using frame reference timing in accordance with various embodiments. System architecture 600 may include application layer 610, latency buffer API 620, and operating system (OS) subsystems and hardware layer 630. System architecture 600 may illustrate, for example, a layer stack for implementation of application-based control of sink buffer size using frame reference timing in the source devices 115 of FIG. 1 or FIG. 2.

When applications (e.g., application 615, etc.) are preparing to transmit a media stream to a sink device, latency buffer API 620 may determine the use case of the media stream (e.g., by application type, etc.). For example, the application 615 may call the latency buffer API 620 as part of setting up the transport stream for transmission of the media stream, or the latency buffer API 620 may query the task manager to determine when application 615 is establishing a transport stream for transmitting a media stream to a sink device 135 for output. Delay manager 625 may determine a sink buffer size $t_{BUF}$ for the transport stream based on the use case of the media stream. Delay manager 625 may determine a presentation offset to apply to packets of a transport stream used to transmit the media stream to the sink device 135 based on the sink buffer size $t_{BUF}$. Latency buffer API 620 may be, for example, a component of a mobile device at the mobile OS service layer.

Latency buffer API 620 may query the wireless driver manager 635 to determine the concurrency and scanning configuration of the device. Delay manager 625 may determine an off-channel concurrency time $t_{CON}$ and/or scanning time $t_{SCAN}$ based on the concurrency and scanning configuration. Delay manager 625 may increase the presentation offset to account for the off-channel concurrency time $t_{CON}$ and/or scanning time $t_{SCAN}$.

Delay manager 625 may notify the encoder 225 and transport stream multiplexor 235 of the presentation offset for the frames of the media stream. The encoder 225 and transport stream multiplexor 235 may generate decode time reference values (e.g., DTS, etc.) and presentation time reference values (e.g., PTS, etc.) for frames of the transport stream based on the determined presentation offset and the clock reference (e.g., PCR, etc.).

User override 645 may allow the user to choose a preference between lower latency or higher reliability display of the media stream and the delay manger 625 may adjust the presentation offset accordingly. The user may be able to set sink-device buffering preferences based on the use categories, for individual applications, or for individual media streams. In some examples, user override 645 may allow the user to set the presentation offset directly (e.g., in ms, etc.).

Figure 7:
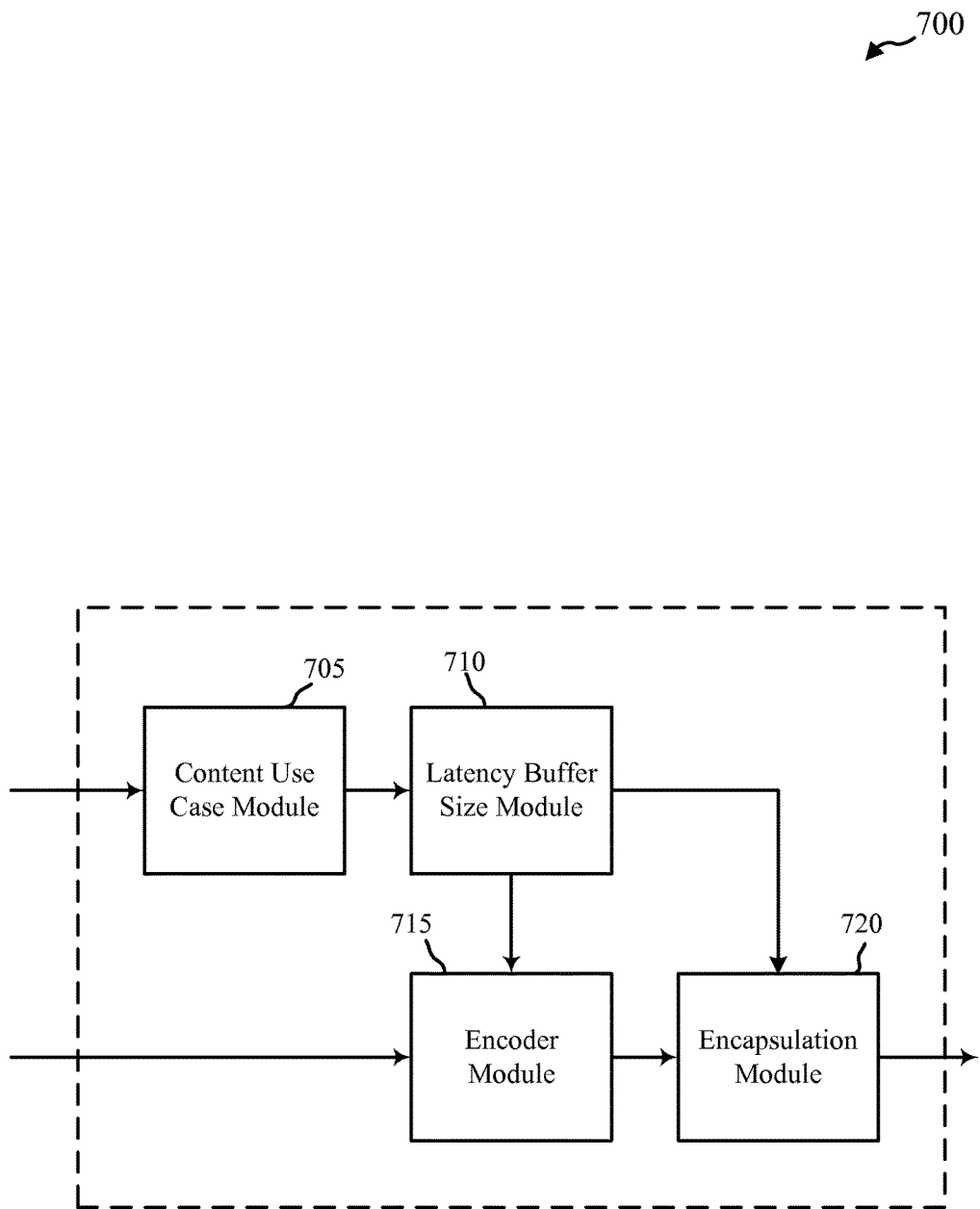
FIG. 7 shows a block diagram illustrating a device for source device control of sink buffer size in accordance with various embodiments.

FIG. 7 is a block diagram illustrating a device 700 for source device control of sink buffer size in accordance with various embodiments. The device 700 may be an example of one or more aspects of one of the source devices 115 described with reference to FIG. 1 or FIG. 2. The device 700 may also be a processor. The device 700 may include a content use case module 705, a latency buffer size module 710, an encoder module 715, and an encapsulation module 720. Each of these components may be in communication with each other.

Content use case module 705 may determine a use case for a media stream to be transmitted to a sink device for output (e.g., display, etc.) at the sink device. Content use case module 705 may determine the use case based on a type of application associated with the media stream. For example, content use case module 705 may determine whether the associated application is used for multimedia playback, interactive computing, gaming, or other use case.

Latency buffer size module 710 may determine a sink buffer size based on the use case of the media stream. For example, the source device 115 may select a higher presentation offset for non-interactive multimedia display and other latency tolerant applications and media streams and lower presentation offset for applications and media streams such as interactive computer or gaming that are less latency tolerant. Latency buffer size module 710 may provide the presentation offset to the encoder module 715 and encapsulation module 720.

Encoder module 715 may encode frames of the media stream and encapsulation module 720 may encapsulate the encoded frames into a transport stream for transmission to the sink device. The encoded frames may be associated with time reference values (e.g., PTS, DTS, etc.) in the transport stream, where the associated time reference values are offset from a shared clock reference by values determined from the presentation offset.

Figure 8:
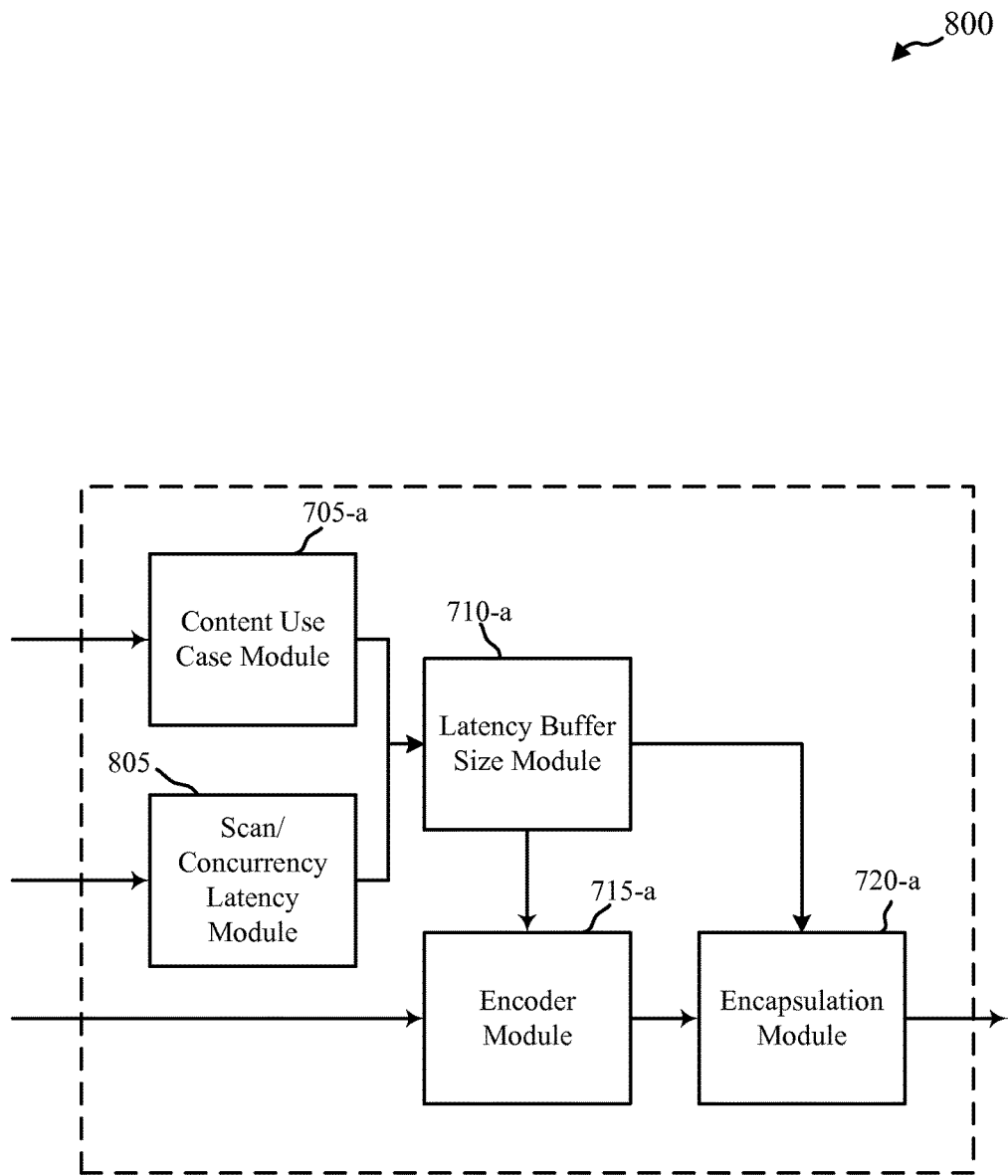
FIG. 8 shows a block diagram illustrating a device for source device control of sink buffer size in accordance with various embodiments.

FIG. 8 is a block diagram illustrating a device 800 in accordance with various embodiments. The device 800 may be an example of one or more aspects of one of the source devices 115 described with reference to FIG. 1 or FIG. 2. The device 800 may also be a processor. The device 800 may include a content use case module 705-*a*, a latency buffer size module 710-*a*, an encoder module 715-*a*, an encapsulation module 720-*a*, and a scan/concurrency latency module 805. Each of these components may be in communication with each other.

The device 800 may be configured to implement aspects discussed above with respect to device 700 of FIG. 7 and may not be repeated here for the sake of brevity. For example, the content use case module 705-*a*, latency buffer size module 710-*a*, encoder module 715-*a*, and encapsulation module 720-*a* may be examples of the content use case module 705, latency buffer size module 710, encoder module 715, and encapsulation module 720 of FIG. 7.

Scan/concurrency latency module 805 may determine an off-channel concurrency time $t_{CON}$ and/or scanning time $t_{SCAN}$ based on the concurrency and scanning configuration. Scan/concurrency latency module 805 may communicate the off-channel concurrency time $t_{CON}$ and/or scanning time $t_{SCAN}$ to the latency buffer size module 710-*a*. The latency buffer size module 710-*a* may determine the sink buffer size based on the use case of the media stream received from the content use case module 705-*a* and further based on the off-channel concurrency time $t_{CON}$ and/or scanning time $t_{SCAN}$ as described above with reference to FIG. 4.

The components of the devices 700 and 800 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by one or more general or application-specific processors.

Figure 9:
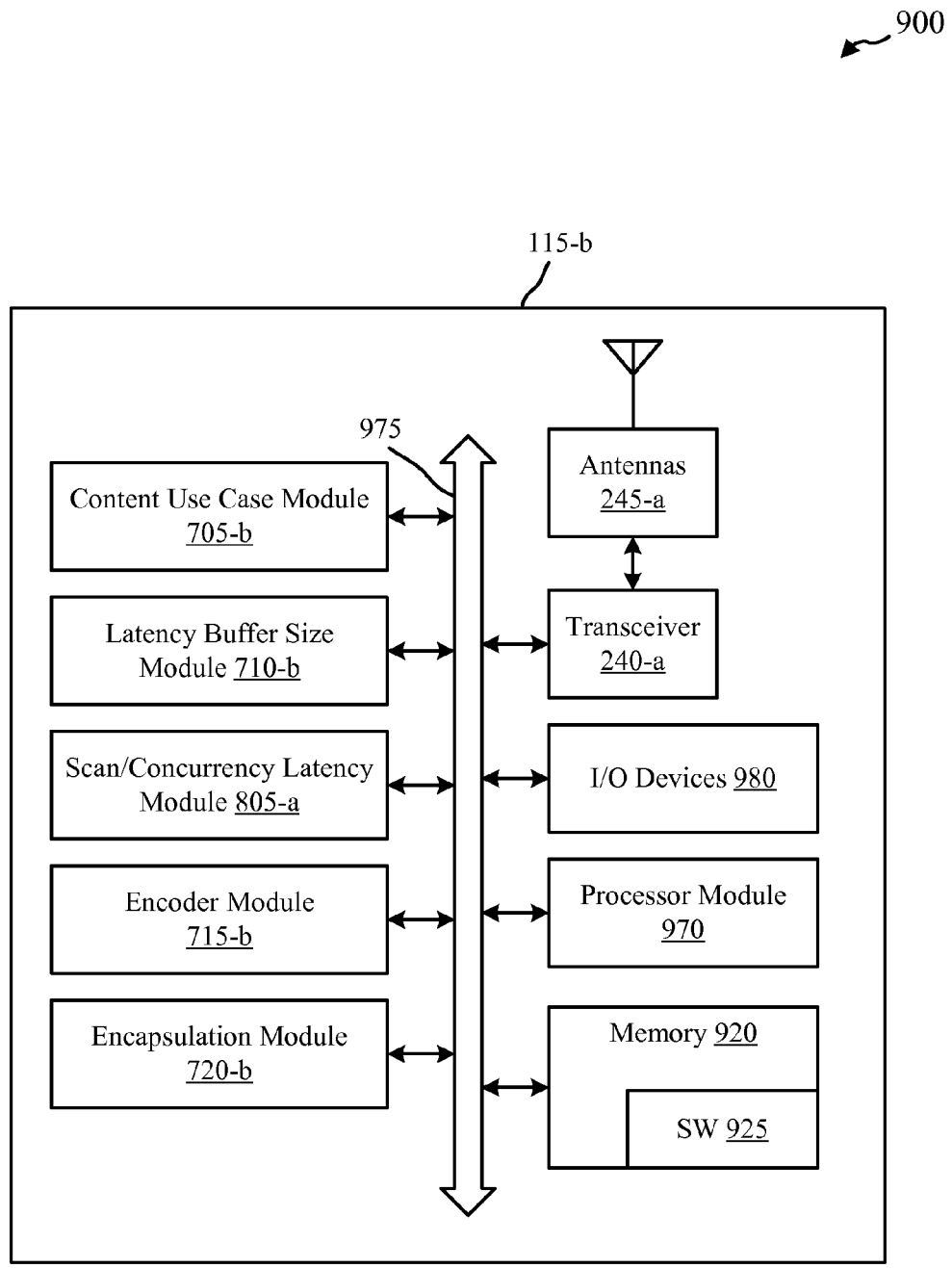
FIG. 9 shows a block diagram of a source device configured for dynamic control of sink buffer size in accordance with various embodiments.

FIG. 9 is a block diagram 900 of a source device 115-*b* configured for dynamic control of sink buffer size in accordance with various embodiments. Source device 115-*b* may be, for example, the source device 115 of FIG. 1 or FIG. 2. The source device 115-*b* may have any of various configurations, such as personal computers (e.g., laptop computers, netbook computers, tablet computers, etc.), smartphones, cellular telephones, PDAs, wearable computing devices, digital video recorders (DVRs), internet appliances, gaming consoles, e-readers, etc. The source device 115-*b* may have an internal power supply (not shown), such as a small battery, to facilitate mobile operation.

The source device 115-*b* includes antenna(s) 245-*a*, a transceiver module 240-*a*, memory 920, a processor module 970, and I/O devices 980, which each may be in communication, directly or indirectly, with each other (e.g., via one or more buses). The transceiver module 240-*a* is configured to communicate bi-directionally, via the antennas 245-*a* and/or one or more wired or wireless links, with one or more networks, as described above. For example, the transceiver module 240-*a* may be configured to communicate bi-directionally with sink devices 135 of FIG. 1 or FIG. 2. The transceiver module 240-*a* may include a modem configured to modulate the packets and provide the modulated packets to the antennas 245-*a* for transmission, and to demodulate packets received from the antennas 245-*a*. The transceiver module 240-*a* may be configured to maintain multiple concurrent communication links using the same or different radio interfaces (e.g., Wi-Fi, cellular, etc.). The source device 115-*b* may include a single antenna 245-*a*, or the source device 115-*b* may include multiple antennas 245-*a*. The source device 115-*b* may be capable of employing multiple antennas 245-*a* for transmitting and receiving communications in a MIMO communication system.

The memory 920 may include random access memory (RAM) and read-only memory (ROM). The memory 920 may store computer-readable, computer-executable software code 925 containing instructions that are configured to, when executed, cause the processor module 970 to perform various functions described herein (e.g., Wi-Fi Display, dynamic configuration of sink buffer size, etc.). Alternatively, the software 925 may not be directly executable by the processor module 970 but be configured to cause the computer (e.g., when compiled and executed) to perform functions described herein.

The processor module 970 may include an intelligent hardware device, e.g., a central processing unit (CPU), a microcontroller, an application specific integrated circuit (ASIC), etc. The processor module 970 may include a speech encoder (not shown) configured to receive audio via a microphone, convert the audio into packets (e.g., 30 ms in length) representative of the received audio, provide the audio packets to the transceiver module 240-a, and provide indications of whether a user is speaking. Alternatively, an encoder may only provide packets to the transceiver module 240-a, with the provision or withholding/suppression of the packet itself providing the indication of whether a user is speaking.

According to the architecture of FIG. 9, the source device 115-b further includes content use case module 705-b, latency buffer size module 710-b, scan/concurrency latency module 805-a, encoder module 715-b, and encapsulation module 720-b. By way of example, these modules may be components of the source device 115-b in communication with some or all of the other components of the source device 115-b via bus 975. Additionally or Alternatively, functionality of these modules may be implemented as a component of the transceiver module 240-a, as a computer program product, and/or as one or more controller elements of the processor module 970.

Content use case module 705-b may determine a use case for a media stream to be transmitted to a sink device 135 for output (e.g., display, etc.) at the sink device 135. Content use case module 705-b may determine the use case based on a type of application associated with the media stream. For example, content use case module 705-b may determine whether the associated application is used for multimedia playback, interactive computing, gaming, or other use case. The media stream may be concurrently output at the source device via I/O devices 980.

Latency buffer size module 710-b may determine a sink buffer size based on the use case of the media stream. For example, the latency buffer size module 710-b may select a higher sink buffer size for non-interactive multimedia display and other latency tolerant applications and media streams and lower sink buffer size for applications and media streams such as interactive computer or gaming that are less latency tolerant. Latency buffer size module 710-b may provide the sink buffer size to the encoder module 715-b and encapsulation module 720-b.

Encoder module 715-b may encode frames of the media stream and encapsulation module 720-b may encapsulate the encoded frames into a transport stream for transmission to the sink device. The encoded frames may be associated with time reference values (e.g., PTS, DTS, etc.) in the transport stream, where the associated time reference values are offset from a shared clock reference by values determined from the sink buffer size.

Scan/concurrency latency module 805-a may determine an off-channel concurrency time $t_{CON}$ and/or scanning time $t_{SCAN}$ based on the concurrency and scanning configuration. Scan/concurrency latency module 805-a may communicate the off-channel concurrency time $t_{CON}$ and/or scanning time $t_{SCAN}$ to the latency buffer size module 710-b. The latency buffer size module 710-b may determine the sink buffer size based on the use case of the media stream received from the content use case module 705-b and further based on the off-channel concurrency time $t_{CON}$ and/or scanning time $t_{SCAN}$.

The components of the source device 115-b may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the source device 115-b.

Figure 10:
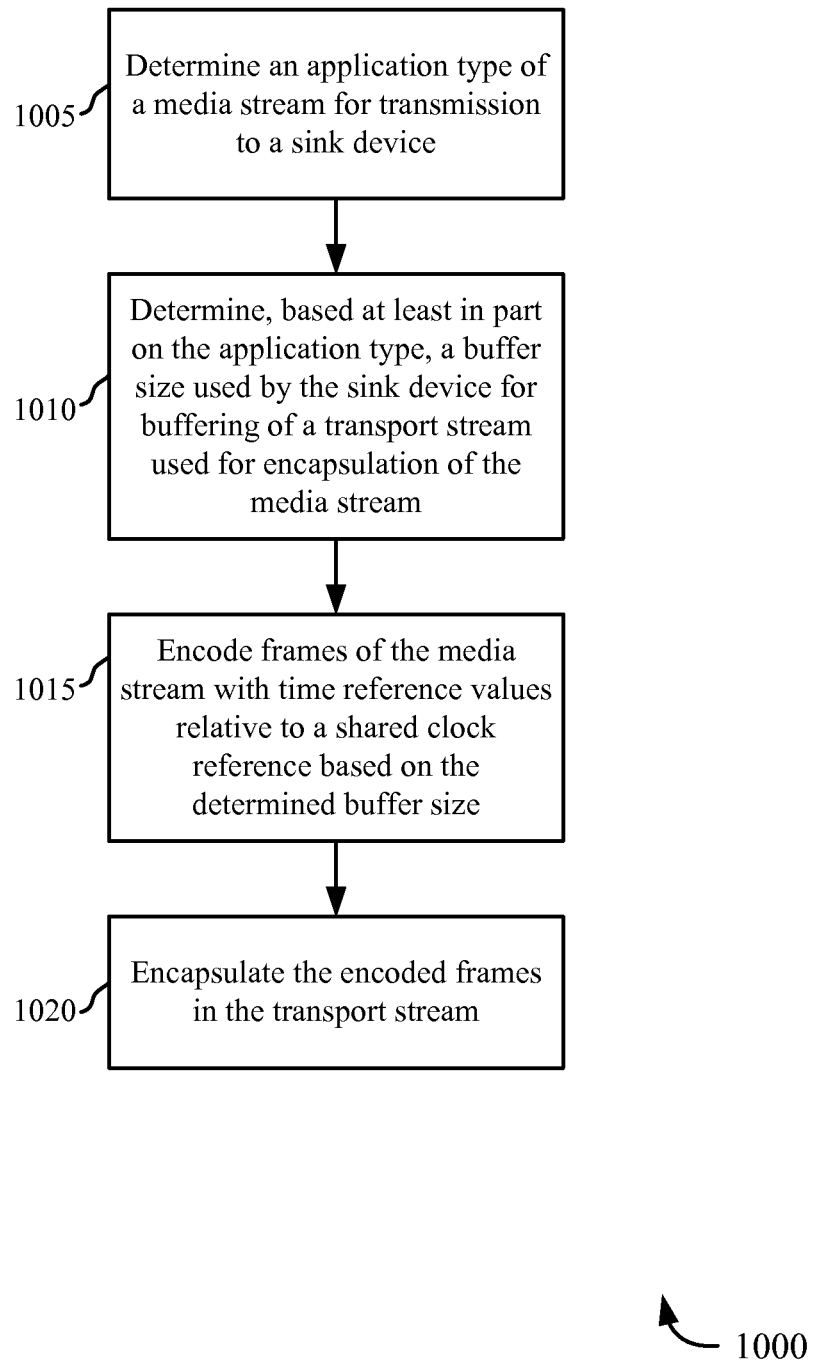
FIG. 10 shows a flow chart illustrating an embodiment of a method for dynamic control of sink buffer size in accordance with various embodiments.

FIG. 10 is a flow chart illustrating an embodiment of a method 1000 for dynamic control of sink buffer size in accordance with various embodiments. For clarity, the method 1000 is described below with reference to the source devices 115 of FIG. 1, FIG. 2, or FIG. 9, and/or the devices 700 or 800 of FIG. 7 or FIG. 8. In one implementation, the devices 700 or 800 described with reference to FIG. 7 or FIG. 8 may execute one or more sets of codes to control the functional elements of a source device 115 to perform the functions described below.

At block 1005 of method 1000, an application type of a media stream for transmission to a sink device 135 may be determined. For example, a source device 115 may determine whether an application associated with the media stream is used for multimedia playback, interactive computing, gaming, or other use case. The application type may be determined by an API of the source device based on a call from the application or from monitoring the task manager.

At block 1010, a buffer size for buffering the transport stream at the sink device 135 is determined based on the application type. For example, a source device 115 may select a higher sink buffer size for non-interactive multimedia display and other latency tolerant applications and media streams and lower sink buffer size for applications and media streams such as interactive computer or gaming that are less latency tolerant.

At block 1015, frames of the media stream are encoded and may be associated with time reference values relative to a shared clock reference based on the determined sink buffer size. For example, decode time reference values (e.g., DTS, etc.) and presentation time reference values (e.g., PTS, etc.) may be determined for frames of the encoded media stream based on the determined sink buffer size and the clock reference (e.g., PCR, etc.).

At block 1020, the encoded frames may be encapsulated in a transport stream (e.g., MPEG-TS, etc.) for transmission to the sink device 135. The source device 115 may transmit the transport stream to the sink device 135 over a connection link (e.g., Wi-Fi Display connection, etc.) supporting the transport stream for output at the sink device 135.

Figure 11:
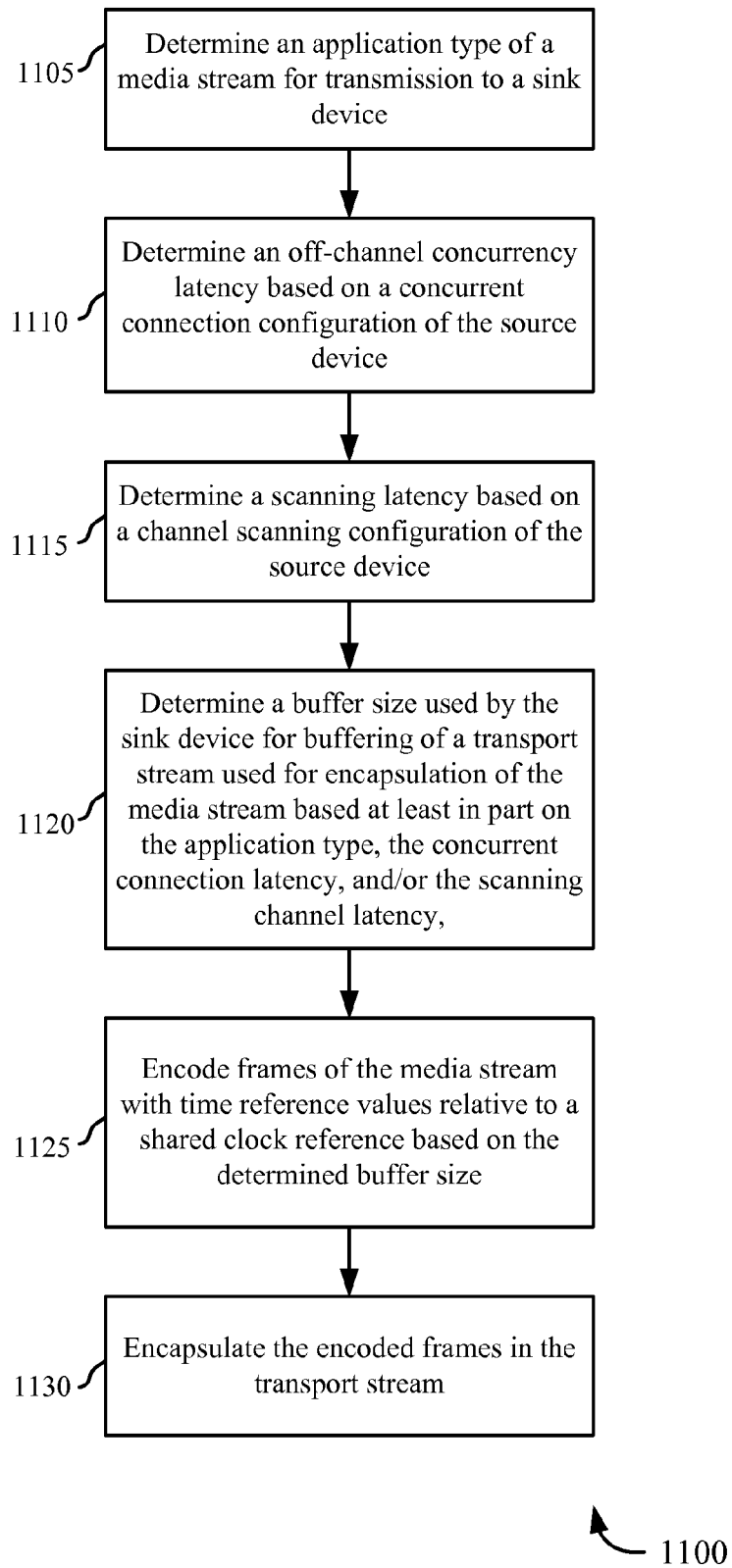
FIG. 11 shows a flow chart illustrating an embodiment of a method 1100 for dynamic control of sink buffer size in accordance with various embodiments.

FIG. 11 is a flow chart illustrating an embodiment of a method 1100 for dynamic control of sink buffer size in accordance with various embodiments. For clarity, the method 1100 is described below with reference to the source devices 115 of FIG. 1, FIG. 2, or FIG. 9, and/or the devices 700 or 800 of FIG. 7 or FIG. 8. In one implementation, the devices 700 or 800 described with reference to FIG. 7 or FIG. 8 may execute one or more sets of codes to control the functional elements of a source device 115 to perform the functions described below.

At block 1105 of method 1100, an application type of a media stream for transmission to a sink device may be determined. For example, a source device may determine whether an application associated with the media stream is used for multimedia playback, interactive computing, gaming, or other use case. The application type may be determined by an API of the source device based on a call from the application or from monitoring the task manager.

At block 1110, the source device 115 may determine an off-channel concurrency latency based on a concurrent connection configuration of the source device. For example, where the source device 115 is using a Wi-Fi Display connection to transmit the media stream to the sink device 135, the source device 115 may determine if other Wi-Fi connections or cellular network connections are concurrently supported and the effect of the concurrently supported connections on latency of the Wi-Fi Display connection.

At block 1115, the source device 115 may determine a scanning latency based on a scanning configuration of the source device. For example, the source device 115 may be currently connected to an access point 105 and may determine that active or passive scanning is to be performed for channels associated with the access point 105.

At block 1120, the source device 115 determines a buffer size for buffering the transport stream at the sink device 135 based on the application type, the off-channel concurrency latency, and/or the scanning latency. For example, the source device 115 may determine an application-based sink buffer size based on the determined application type of the media stream and may add the off-channel concurrency latency and the scanning latency to the application-based sink buffer size to determine the sink buffer size to be used for encapsulation of the media stream into a transport stream.

At block 1125, frames of the media stream are encoded and may be associated with time reference values relative to a shared clock reference based on the determined sink buffer size. For example, decode time reference values (e.g., DTS, etc.) and presentation time reference values (e.g., PTS, etc.) may be determined for frames of the encoded media stream based on the determined sink buffer size and the clock reference (e.g., PCR, etc.).

At block 1130, the encoded frames may be encapsulated in a transport stream (e.g., MPEG-TS, etc.) for transmission to the sink device 135. The source device 115 may transmit the transport stream to a sink device 135 over a connection link (e.g., Wi-Fi Direct connection, etc.) supporting the transport stream for output at the sink device 135.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method performed by a source device, comprising:
determining an application type of a media stream for transmission to a sink device;
determining at least one of an off-channel concurrency latency based at least in part on a concurrent connection configuration of the source device or a scanning latency using a channel scanning configuration of the source device;
determining, based at least in part on the application type and at least one of the off-channel concurrency latency or the scanning latency, a buffer size used by the sink device for buffering of a transport stream used for encapsulation of the media stream;
encoding frames of the media stream with time reference values relative to a shared clock reference using the determined buffer size; and
encapsulating the encoded frames in the transport stream.

2. The method of claim 1, comprising:
determining the off-channel concurrency latency based at least in part on the concurrent connection configuration of the source device,
wherein determining the buffer size is further based on the determined off-channel concurrency latency.

3. The method of claim 1, comprising:
determining the scanning latency using the channel scanning configuration of the source device,
wherein determining the buffer size is further based on the determined scanning latency.

4. The method of claim 1, further comprising:
transmitting the transport stream to the sink device over a wireless local area network connection.

5. The method of claim 4, further comprising:
displaying the media stream at the source device concurrently with encoding of the media stream for transmission to the sink device.

6. The method of claim 4, further comprising:
transmitting time values of the shared clock reference at periodic intervals in the transport stream.

7. The method of claim 1, wherein determining the application type is based at least in part on an application associated with the media stream.

8. The method of claim 1, wherein the application type of the media stream is one of a gaming application type, an interactive computing application type, or a media viewing application type.

9. The method of claim 1, wherein the transport stream comprises a Moving Picture Experts Group (MPEG) transport stream (MPEG-TS).

10. The method of claim 1, wherein the time reference values comprise one or more of a presentation time stamp (PTS) or a decode time stamp (DTS), or a combination thereof.

11. The method of claim 1, wherein the shared clock reference comprises a program clock reference (PCR) synchronized at the sink device.

12. The method of claim 1, further comprising:
receiving, by an application programming interface of the source device, a call from an application running on the source device for establishing a streaming display connection with the sink device, and
wherein determining the application type of the media stream is based on the received call.

13. An apparatus for dynamic control of sink device buffering by a source device, the apparatus comprising:
means for determining an application type of a media stream for transmission to a sink device;
means for determining at least one of an off-channel concurrency latency based at least in part on a concurrent connection configuration of the source device or a scanning latency using a channel scanning configuration of the source device;
means for determining, based at least in part on the application type and at least one of the off-channel concurrency latency or the scanning latency, a buffer size used by the sink device for buffering of a transport stream used for encapsulation of the media stream;
means for encoding frames of the media stream with time reference values relative to a shared clock reference using the determined buffer size; and
means for encapsulating the encoded frames in the transport stream.

14. The apparatus of claim 13, comprising:
means for determining the off-channel concurrency latency based at least in part on the concurrent connection configuration of the source device,
wherein the means for determining the buffer size further determines the buffer size based on the determined off-channel concurrency latency.

15. The apparatus of claim 13, comprising:
means for determining the scanning latency using the channel scanning configuration of the source device,
wherein the means for determining the buffer size further determines the buffer size based on the determined scanning latency.

16. The apparatus of claim 13, further comprising:
means for transmitting the transport stream to the sink device over a wireless local area network connection.

17. The apparatus of claim 16, further comprising:
means for displaying the media stream at the source device concurrently with encoding of the media stream for transmission to the sink device.

18. The apparatus of claim 16, further comprising:
means for transmitting time values of the shared clock reference at periodic intervals in the transport stream.

19. The apparatus of claim 13, wherein the means for determining the application type determines the application type based at least in part on an application associated with the media stream.

20. The apparatus of claim 13, wherein the application type of the media stream is one of a gaming application type, an interactive computing application type, or a media viewing application type.

21. The apparatus of claim 13, wherein the transport stream comprises a Moving Picture Experts Group (MPEG) transport stream (MPEG-TS).

22. The apparatus of claim 13, wherein the time reference values comprise one or more of a presentation time stamp (PTS) or a decode time stamp (DTS), or a combination thereof.

23. The apparatus of claim 13, wherein the shared clock reference comprises a program clock reference (PCR) synchronized at the sink device.

24. The apparatus of claim 13, further comprising:
means for receiving, by an application programming interface of the source device, a call from an application running on the source device for establishing a streaming display connection with the sink device, and wherein the means for determining the application type of the media stream determines the application type based on the received call.

25. A device for dynamic control of sink device buffering by a source device, comprising:
   a processor; and
   a memory in electronic communication with the processor, the memory embodying instructions, the instructions being executable by the processor to:
      determine an application type of a media stream for transmission to a sink device;
      determine at least one of an off-channel concurrency latency based at least in part on a concurrent connection configuration of the source device or a scanning latency using a channel scanning configuration of the source device;
      determine, based at least in part on the application type and at least one of the off-channel concurrency latency or the scanning latency, a buffer size used by the sink device for buffering of a transport stream used for encapsulation of the media stream;
      encode frames of the media stream with time reference values relative to a shared clock reference using the determined buffer size; and
      encapsulate the encoded frames in the transport stream.

26. The device of claim 25, the memory embodying instructions being executable by the processor to:
   determine the off-channel concurrency latency based at least in part on the concurrent connection configuration of the source device; and
   determine the buffer size further based on the determined off-channel concurrency latency.

27. The device of claim 25, the memory embodying instructions being executable by the processor to:
   determine the scanning latency using the channel scanning configuration of the source device; and
   determine the buffer size further based on the determined scanning latency.

28. The device of claim 25, the memory further embodying instructions being executable by the processor to:
   transmit the transport stream to the sink device over a wireless local area network connection.

29. The device of claim 28, the memory further embodying instructions being executable by the processor to:
   display the media stream at the source device concurrently with encoding of the media stream for transmission to the sink device.

30. The device of claim 28, the memory further embodying instructions being executable by the processor to:
   transmit time values of the shared clock reference at periodic intervals in the transport stream.

31. The device of claim 25, the memory further embodying instructions being executable by the processor to:
   determine the application type based at least in part on an application associated with the media stream.

32. The device of claim 25, wherein the application type of the media stream is one of a gaming application type, an interactive computing application type, or a media viewing application type.

33. The device of claim 25, wherein the transport stream comprises a Moving Picture Experts Group (MPEG) transport stream (MPEG-TS).

34. The device of claim 25, wherein the time reference values comprise one or more of a presentation time stamp (PTS) or a decode time stamp (DTS), or a combination thereof.

35. The device of claim 25, wherein the shared clock reference comprises a program clock reference (PCR) synchronized at the sink device.

36. The device of claim 25, the memory further embodying instructions being executable by the processor to:
   receive, by an application programming interface of the source device, a call from an application running on the source device for establishing a streaming display connection with the sink device; and
   determine the application type of the media stream based on the received call.

37. A non-transitory computer program product for dynamic control of sink device buffering by a source device, comprising:
   a non-transitory computer-readable medium, comprising code for:
      determining an application type of a media stream for transmission to a sink device;
      determining at least one of an off-channel concurrency latency based at least in part on a concurrent connection configuration of the source device or a scanning latency using a channel scanning configuration of the source device;
      determining, based at least in part on the application type, and at least one of the off-channel concurrency latency or the scanning latency, a buffer size used by the sink device for buffering of a transport stream used for encapsulation of the media stream;
      encoding frames of the media stream with time reference values relative to a shared clock reference using the determined buffer size; and
      encapsulating the encoded frames in the transport stream.

38. The non-transitory computer program product of claim 37, wherein the non-transitory computer-readable medium comprises code for:
   determining the off-channel concurrency latency based at least in part on the concurrent connection configuration of the source device; and
   determining the buffer size further based on the determined off-channel concurrency latency.

39. The non-transitory computer program product of claim 37, wherein the non-transitory computer-readable medium comprises code for:
   determining the scanning latency based at least in part on the channel scanning configuration of the source device; and
   determining the buffer size further based on the determined scanning latency.

40. The non-transitory computer program product of claim 37, wherein the non-transitory computer-readable medium further comprises code for:
   transmitting the transport stream to the sink device over a wireless local area network connection.

41. The non-transitory computer program product of claim 40, wherein the non-transitory computer-readable medium further comprises code for:
   displaying the media stream at the source device concurrently with encoding of the media stream for transmission to the sink device.

42. The non-transitory computer program product of claim 40, wherein the non-transitory computer-readable medium further comprises code for: transmitting time values of the shared clock reference at periodic intervals in the transport stream.

43. The non-transitory computer program product of claim 37, wherein the non-transitory computer-readable medium further comprises code for:

determining the application type based at least in part on an application associated with the media stream.

47. The non-transitory computer program product of claim 37, wherein the application type of the media stream is one of a gaming application type, an interactive computing application type, or a media viewing application type.

45. The non-transitory computer program product of claim 37, wherein the transport stream comprises a Moving Picture Experts Group (MPEG) transport stream (MPEG-TS).

46. The non-transitory computer program product of claim 37, wherein the time reference values comprise one or more of a presentation time stamp (PTS) or a decode time stamp (DTS), or a combination thereof.

47. The non-transitory computer program product of claim 37, wherein the shared clock reference comprises a program clock reference (PCR) synchronized at the sink device.

48. The non-transitory computer program product of claim 37, wherein the non-transitory computer-readable medium further comprises code for:
  receiving, by an application programming interface of the source device, a call from an application running on the source device for establishing a streaming display connection with the sink device; and
  determining the application type of the media stream based on the received call.

* * * * *